3,490,984
ART OF PRODUCING HIGH-STRENGTH,
SURFACE-CRYSTALLIZED, GLASS BODIES
Richard W. Petticrew, Perrysburg, Charles E. Schott,
Toledo, and William E. Smith, Sylvania, Ohio, assignors to Owens-Illinois, Inc., a corporation of Ohio
No Drawing. Filed Dec. 30, 1965, Ser. No. 517,824
Int. Cl. B32b *17/06;* B44f *1/00*
U.S. Cl. 161—6    5 Claims

ABSTRACT OF THE DISCLOSURE

A glass body having on its surface a thin, compressive, crystalline layer containing a multiplicity of microscopic crystals and having a lineal coefficient of thermal expansion substantially lower than that of the glass body. The oxide composition of the body and the surface layer are substantially the same throughout and consist essentially of the following oxides in weight percent: $SiO_2$ 60–75, $Al_2O_3$ 10–20, MgO 2–10 and $Li_2O$ 2–4. At least one member of the group of $ZrO_2$, $TiO_2$ and $SnO_2$ may also be present but in an amount not exceeding 3 weight percent $ZrO_2$, 1.5 weight percent $TiO_2$ or 2 weight percent $SnO_2$. The method of making the glass body of the invention comprises heating the surface-crystallizable glass composition through the annealing-point range of the glass composition to a higher temperature at which its viscosity is within the range of $10^{10.5}$ to $10^{7.65}$ poises and holding the glass composition for a period of time of from about 2–5 minutes up to about 40 hours or more until the desired degree of surface-crystallization has been obtained.

---

This invention relates broadly to the art of producing high-strength, surface-crystallized (surface semi-crystallized), glass bodies. More particularly it is concerned with the production of glass bodies or articles having a crystalline-containing surface layer formed in situ by heating a particular surface-crystallizable glass of the composition area $Li_2O$—MgO—$Al_2O_3$—$SiO_2$ under controlled conditions, more especially at a temperature at which its viscosity is within the range of from $10^{10.5}$ to $10^{7.65}$ poises, and which is a critical viscosity in practicing the present invention. The scope of the invention includes both composition and method features.

The surface-crystallizable glass compositions that are useful as a starting material in carrying the instant invention into effect are those consisting essentially of the following oxides in weight percent and which are calculated percentages based on the proportions of batch ingredients used in making the glass, exclusive of minor impurities in the respective batch materials:

| | |
|---|---|
| $SiO_2$ | 60–75 |
| $Al_2O_3$ | 10–20 |
| MgO | 2–10 |
| $Li_2O$ | 2–4 |
| $ZrO_2$ | 0–3 |
| $TiO_2$ | 0–1.5 |
| $SnO_2$ | 0–2 |
| BaO | 0–15 |
| ZnO | 0–10 |
| CaO | 0–10 |
| SrO | 0–2 |
| $Na_2O$ | 0–1 |
| $CeO_2$ | 0–4 |
| $K_2O$ | 0–2 |
| $P_2O_5$ | 0–2 |
| $As_2O_3$ | 0–1 |

Although the above-described, surface-crystallizable glasses contain the specified components within the specified ranges, they may also contain other compatible ingredients in amounts that do not change the capability of the glass to be surface crystallized in accordance with this invention. Thus the term "consisting essentially of" as used herein and in the appended claims reference to the above glass compositions means that the glasses can optionally contain other compatible inorganic ingredients such as, for example, pentavalent antimony in the form of sodium antimonate ($Na_2O \cdot Sb_2O_5$), which is a fining and oxidizing agent that may be added to improve glass quality, as well as numerous other oxides, sulfides and halides of various metals employed as components of glasses for such purposes as to color the glass, to improve its working properties, or for other reasons. No such additives or amount thereof is intended to be included by the foregoing definition that would preclude the obtainment of a true glass having the characteristics described herein or that would cause the glass to crystallize completely (i.e., throughout its bulk) upon being subjected to the aforementioned controlled heat-treatment. Thus, the glasses may contain initially up to 1.5 weight percent of $F_2$, of which about one-half may be retained in the surface-crystallized glass; or up to 3 weight percent of colorants such as cobalt oxide or nickel oxides.

It was known prior to the present invention that glass bodies or articles having high mechanical strength could be produced by providing the article with a stress of substantially uniform compression in the surface and parallel therewith. See, for example, U.S. Patents, 2,779,136—Hood et al. and 2,998,675—Olcott et al. The method proposed by Hood et al. comprises first forming an article containing 45–80% $SiO_2$ and 7–25% $Na_2O$ and/or $K_2O$. This article is then contacted while at a temperature above its strain point but below its softening point with a lithium salt, e.g., LiCl or $Li_2SO_4$, which will be molten, but which will not decompose objectionably, at such temperature. The article is maintained in contact with the lithium salt at the aforementioned temperature for a time sufficient to permit lithium ions to diffuse into the surface of the glass in exchange for alkali-metal ions of the glass.

Olcott et al. proposed a different method from that of Hood et al. in making a glass body of high mechanical and thermal strength, and which has on its surface a thin, compressive, semi-crystalline layer of the same oxide composition as the main body of the glass. The method of Olcott et al. requires the use of certain critical ranges of $SiO_2$, $Li_2O$, $Al_2O_3$ and "crystallization catalyst," by which latter expression is meant specifically $TiO_2$ and/or $B_2O_3$ and/or $Na_2O$ and/or PbO. These patentees state that by their method there is formed in and below the surface of their heat-treated glass a thin, compressive, semi-crystalline layer containing a multiplicity of microscopic and submicroscopic crystals of beta-eucryptite ($Li_2O \cdot Al_2O_3 \cdot 2SiO_2$) as the primary crystalline phase and having a linear thermal expansion coefficient substantially lower than that of the glass per se.

It will be noted that unlike the prior-art glasses of Olcott et al., supra, the surface-crystallizable (including potentially surface-crystallizable) glasses used in practicing this invention contain from 2 to 10 wt. percent of MGO. This fundamental difference in composition is a possible and perhaps probable explanation for the fact that the present applicants are able to obtain obvious results that are different in kind from those taught by Olcott et al. For example, these patentees state (col. 2, lines 58–65):

". . . When the $SiO_2$ content is below 65 parts by weight and the $Al_2O_3$ content is above 30 parts the crystallization catalyst is not essential for promoting the surface crystallization but when the $SiO_2$ content is over 72 parts and the $Al_2O_3$ content is less than 22.5 parts a satisfactory semicrystalline surface layer cannot be produced."

In marked contrast we have found that, by properly controlled heat treatment of the surface-crystallizable glasses used by us, a crystallization catalyst can be omitted (as shown by, for instance, glass composition No. 9 in Table II given later herein) and a satisfactory semi-crystalline surface layer can be produced when the $SiO_2$ content is, for example, 72.1 wt. percent and the $Al_2O_3$ content is, for instance, 16.9 wt. percent. Furthermore, we have been able to obtain surface-crystallized glasses by controlled heat-treatment of surface-crystallizable glasses that contain no crystallization catalyst and wherein the $SiO_2$ content was less than 65 wt. percent and the $Al_2O_3$ content was less than 30 wt. percent e.g., of the order of 16.5 wt. percent. These findings are directly contrary to the above-quoted teachings of Olcott et al.

Other methods of producing high-strength glass bodies have involved reaction with acid vapors or leaching of the surface of the glass with cold acids before heat treatment.

The present invention is based in part on our discovery that glasses from a large composition area within the quaternary system $Li_2O$—$MgO$—$Al_2O_3$—$SiO_2$ can be heat-treated in such a manner that there is formed a crystalline surface layer of a low expansion phase containing finely divided crystals of beta-spodumene and/or beta-eucryptite (or of beta-spodumene-like and/or beta-eucryptite-like crystals), or mixtures of any or all of the aforesaid crystals, substantially uniformly dispersed in a thin layer of a glassy matrix, which latter differs in composition from the main body of the glass due to the precipitation of crystals therefrom. The difference in thermal expansion between the bulk glass and its integral surface layer is such that the surface is placed in high compression, thereby increasing the strength of the overall body several fold. The crystallized surface layer that is formed may vary considerably in thickness, e.g., up to a thickness ranging from about 20 to 300, usually 150–200 microns, with individual crystals of, for instance, less than 25 microns, more particularly from about 5 to 10 microns, in cross-section. The invention provides surface-crystallized glass structures or articles in transparent (or nearly transparent), translucent or opaque form.

The instant invention is also based in part on our additional discovery that surface-crystallized glasses can be made from glass compositions which normally bulk crystallize (i.e., crystallize throughout their entire mass rather than on the surface only) by avoiding the temperature range at which nucleation occurs readily. Additionally it has been found that a reduction in the total amount of nucleating agent(s) that are normally incorporated into glass compositions to effect bulk crystallization will impart to at least certain glass compositions the surface-crystallization characteristic described above when the glass is subjected to the appropriate controlled heat treatment.

The present invention is also based in part upon our further discovery of several additives that are capable of suppressing or inhibiting nucleation of bulk crystallization but not of surface crystallization during controlled heat treatment of the particular glass. Among such additives may be mentioned CaO, $CeO_2$ and $As_2O_3$. Other additives such as $K_2O$ and $B_2O_3$ likewise may be used to suppress or limit nucleation leading to bulk crystallization, as may also limited amounts of ZnO and BaO. The available evidence strongly indicates that some of these additives have another characteristic function, namely, to increase the thermal expansion of the main-body portion of glass thereby increasing the amount of compression in the semi-crystalline surface layer.

With further reference to the glass compositions used in practicing this invention and which consist essentially of the oxides in the proportions broadly set forth in the second paragraph of this specification and more specifically hereafter, it may be stated that they are more versatile in their amenability to surface crystallization than those heretofore employed or suggested for use in making glass bodies or structures having a thin, compressive, semi-crystalline layer that imparts high mechanical strength to the glass article.

The $SiO_2$, $Al_2O_3$, MgO and $Li_2O$ contents of the glass compositions described in the second paragraph of this specification preferably are in the following approximate weight percents:

| | |
|---|---|
| $SiO_2$ | 62.5–72.5 |
| $Al_2O_3$ | 10.0–17.0 |
| MgO | 2.5–8.0 |
| $Li_2O$ | 2.5–3.0 |

From the description of the glass compositions given in the second paragraph of this specification it will be noted that they may contain, in weight percent, from zero to 3.0 $ZrO_2$; from zero to 1.5 $TiO_2$; and from zero to 2.0 $SnO_2$. Such additives normally might be considered to be nucleating or crystallization agents, more particularly when the amount thereof is less than that which would adversely affect the working properties of the glass. The use of such ingredients in the glass is optional, depending upon such influencing factors as, for example, the other oxides and amounts thereof that are present in the glass, the particular controlled heat treatment that is applied to the surface-crystallizable glass, and the particular properties desired in the surface-crystallized glass.

In most cases, however, the surface-crystallizable glass compositions contain a positive but small amount of at least one member of the group consisting of $ZrO_2$, $TiO_2$ and $SnO_2$ not exceeding 3 weight percent $ZrO_2$, 1.5 weight percent $TiO_2$ or 2 weight percent $SnO_2$. When such additives are included in the glass, and when the formulation of the latter is such that, from past experience, one might expect that it might bulk crystallize with comparative ease, then in accordance with this invention bulk crystallization is obviated by (a) avoiding the nucleation temperature range and/or (b) including in the glass formulation an agent that inhibits or suppresses nucleation leading to bulk crystallization. Numerous examples of such inhibitors or suppressants have been given hereinbefore.

In those glass compositions containing $ZrO_2$, $TiO_2$ and/or $SnO_2$, there is preferably present a positive amount of the said oxides not exceeding a total of 3.5, preferably below 3.0, weight percent. The amount of $ZrO_2$ and $TiO_2$ (if either or both are present) are each within the range of from 0.2 to 1.5 weight percent, and the amount of $SnO_2$ (if present) is within the range of from 0.1 to 1.0 weight percent.

Various other ingredients having no deleterious effects on the desired physical properties of the final surface-crystallized glass can be incorporated into the surface-crystallizable glass. For instance, such additives may be employed to improve glass-working properties; or, as previously has been mentioned, their purpose may be to inhibit or suppress nucleation leading to bulk crystallization. Such additives can be, for example, any of those specified below and in the ranges of weight percents there specified.

Glasses such as those described above are prepared in the usual manner by melting mixtures of conventional starting materials such as the oxides, carbonates, etc., in either electric or gas-fired furnaces. Melting temperatures within the range of about 2800° to 2950° F. are usually satisfactory. For example, nine different surface-crystallizable glasses were made by melting together the specified raw materials set forth in the following Table I.

TABLE I

| Raw materials | No. 1 | No. 2 | No. 3 | No. 4 | No. 5 | No. 6 | No. 7 | No. 8 | No. 9 |
|---|---|---|---|---|---|---|---|---|---|
| Petalite | 3,275 | 3,548 | 3,275 | 3,275 | 3,275 | 3,009 | 3,110 | 3,009 | 3,058 |
| Alumina | 278 | 157 | 278 | 278 | 128 | 309 | 283 | 325 | 333 |
| Periclase | 389 | 357 | 388 | 357 | | 259 | 258 | 259 | 270 |
| Flint | 574 | 485 | 568 | 791 | 855 | 1,058 | 998 | 1,096 | 1,149 |
| Zircon | 94 | | 113 | 95 | 76 | 99 | 98 | 91 | 216 |
| ZnO | 187 | 500 | 175 | | | 51 | 50 | | |
| $BaCO_3$ | 322 | | 322 | 241 | 322 | 178 | 178 | 178 | |
| $TiO_2$ | | | | 63 | | 75 | 70 | | 76 |
| $SnO_2$ | | | | | | 50 | 15 | 50 | 15 |
| Burned dolomite | | | | | 330 | | | | |
| Sodium nitrate | | | | | 25 | | 51 | | |
| $As_2O_3$ | | | | | | 25 | | 50 | 50 |
| LiF | | | | | | 10 | 6.3 | 10 | |
| Aluminum metaphosphate | | | | | | 32 | | | |
| $MnO_2$ | | | | | | 6 | | | |
| Soda ash | | | | | | | | | 5.5 |

| | Weight percent |
|---|---|
| BaO | 0–15 |
| ZnO | 0–10 |
| CaO | 0–10 |
| SrO | 0–2 |
| $Na_2O$ | 0–1 |
| $K_2O$ | 0–2 |
| $CeO_2$ | 0–4 |
| $P_2O_5$ | 0–2 |
| $F_2$ | 0–1.5 |

An intimate mixture of the ingredients constituting each of the glass batches shown in Table I is melted, and is held in molten state at 2900° F. for 18–22 hours in a gas-fired furnace having about 0.8% excess oxygen. The resulting glass compositions consist essentially of the oxides and in the weight percentages shown in the following Table II.

TABLE II

| Glass Composition No. | $SiO_2$ | $Al_2O_3$ | MgO | $Li_2O$ | $ZrO_2$ | $TiO_2$ | ZnO | BaO | CaO | $SnO_2$ | $Na_2O$ | Others | | Liquidus, °F. |
|---|---|---|---|---|---|---|---|---|---|---|---|---|---|---|
| 1 | 63.0 | 16.5 | 7.6 | 3.0 | 1.25 | | 3.75 | 5.0 | | | | | | 2,340 |
| 2 | 64.85 | 15.0 | 7.0 | 3.25 | | | 10.0 | | | | | | | 2,325 |
| 3 | 63.0 | 16.5 | 7.6 | 3.0 | 1.5 | | 3.5 | 5.0 | | | | | | 2,395 |
| 4 | 67.35 | 16.5 | 7.0 | 3.0 | 1.25 | 1.25 | | 3.75 | | | | | | 2,345 |
| 5 | 68.5 | 13.5 | 2.6 | 3.0 | 1.0 | 1.5 | | 5.0 | 3.8 | 1.0 | | $NaNO_3$, 0.5 | | 2,330 |
| 6 | 68.2 | 16.0 | 5.0 | 2.7 | 1.3 | 1.4 | 1.0 | 2.7 | | 0.3 | | 0.2 | $\{As_2O_3, 0.5; F_2, 0.15; P_2O_5, 0.5; MnO, 0.1\}$ | 2,370 |
| 7 | 68.5 | 16.4 | 5.0 | 2.7 | 1.3 | | 1.0 | 2.7 | | 1.0 | | 0.37 | $\{As_2O_3, 1.0; F_2, 0.1\}$ | 2,360 |
| 8 | 68.9 | 16.2 | 5.0 | 2.7 | 1.2 | 1.5 | | 2.7 | | 0.3 | | 0.37 | $\{As_2O_3, 1.0; F_2, 0.15\}$ | 2,370 |
| 9 | 72.1 | 16.9 | 5.3 | 2.85 | 2.85 | | | | | | | | | 2,660 |

As mentioned in the third paragraph of this specification, fining and oxidizing agents, e.g., sodium antimonate, also can be included in the batch in order to improve the quality of the glass; also, for this same purpose, up to 1% $As_2O_3$ together with niter can be included.

In a manner similar to that described above with reference to the preparation of surface-crystallizable glass compositions Nos. 1 through 9, inclusive (reference: Tables I and II), the following other surface-crystallizable glass compositions consisting essentially of the oxides in the approximate weight percents shown in Table III are prepared.

TABLE III

| Glass Composition No. | $SiO_2$ | $Al_2O_3$ | MgO | $Li_2O$ | $ZrO_2$ | $TiO_2$ | ZnO | BaO | CaO | $SnO_2$ | $Na_2O$ | Others | Liquidus, °F. |
|---|---|---|---|---|---|---|---|---|---|---|---|---|---|
| 10 | 64.65 | 16.5 | 7.0 | 3.2 | | | 8.75 | | | | | | 2,305 |
| 11 | 64.85 | 16.3 | 7.0 | 3.2 | | | 8.75 | | | | | | 2,280 |
| 12 | 64.85 | 16.5 | 6.8 | 3.2 | | | 8.75 | | | | | | 2,310 |
| 13 | 62.85 | 16.5 | 7.0 | 3.0 | | | 8.75 | | | | | $P_2O_5$, 2.0 | 2,280 |
| 14 | 68.5 | 16.0 | 7.0 | 3.5 | | | | 3.0 | | | | $BaSO_4$, 2.0 | 2,350 |
| 15 | 69.7 | 16.3 | 7.0 | 3.0 | | | 3.8 | | | | | | 2,335 |
| 16 | 69.7 | 16.3 | 7.2 | 3.0 | | | | | 3.8 | | | | 2,355 |
| 17 | 63.0 | 16.5 | 7.6 | 3.0 | 1.5 | | 3.75 | 4.75 | | | | | 2,330 |
| 18 | 64.65 | 16.5 | 7.0 | 3.2 | | | 5.0 | 3.75 | | | | | 2,295 |
| 19 | 64.25 | 15.5 | 7.0 | 3.25 | | | 10.0 | | | | | | 2,260 |
| 20 | 64.25 | 16.5 | 7.0 | 3.5 | | | 8.75 | | | | | | 2,280 |
| 21 | 63.0 | 16.5 | 7.6 | 3.0 | 1.5 | | 8.5 | | | | | | 2,350 |
| 22 | 69.7 | 16.3 | 7.2 | 3.0 | 1.5 | | 2.3 | | | | | | 2,390 |
| 23 | 69.7 | 16.3 | 7.2 | 3.0 | 1.5 | | | | 2.3 | | | | 2,340 |
| 24 | 69.7 | 16.3 | 7.2 | 3.0 | 1.5 | | 2.3 | | | | | $F_2$, 0.5 | 2,355 |

TABLE III—Continued

| Glass Composition No. | SiO2 | Al2O3 | MgO | Li2O | ZrO2 | TiO2 | ZnO | BaO | CaO | SnO2 | Na2O | Others | Liquidus, °F. |
|---|---|---|---|---|---|---|---|---|---|---|---|---|---|
| 25 | 69.3 | 16.3 | 7.2 | 3.0 | 1.5 |  | 2.3 |  |  |  |  | F2, 1.0 | 2,360 |
| 26 | 69.0 | 16.3 | 7.2 | 3.0 | 1.5 |  | 2.3 |  |  |  |  | F2, 1.5 | 2,405 |
| 27 | 70.2 | 17.5 | 2.6 | 3.5 | 0.3 |  | 5.9 |  |  |  |  |  | 2,310 |
| 28 | 63.0 | 16.5 | 7.6 | 3.0 | 1.5 |  | 3.75 | 4.75 |  |  |  |  | 2,270 |
| 29 | 69.0 | 16.6 | 7.1 | 2.7 |  | 1.0 |  |  |  |  |  | CeO2, 3.6 | 2,300 |
| 30 | 67.35 | 16.5 | 7.0 | 3.0 |  | 1.25 |  | 3.75 |  | 1.25 |  |  | 2,280 |
| 31 | 67.35 | 16.5 | 7.0 | 3.0 |  | 1.25 |  | 5.0 |  |  |  |  | 2,275 |
| 32 | 65.5 | 14.5 | 3.0 | 2.6 | 1.5 |  |  | 8.5 | 4.4 |  |  |  | 2,240 |
| 33 | 65.5 | 14.5 | 3.0 | 2.6 | 2.0 |  |  | 8.0 | 4.4 |  |  |  | 2,410 |
| 34 | 65.5 | 14.5 | 3.0 | 2.6 | 1.5 | 1.5 |  | 7.0 | 4.4 |  |  |  | 2,285 |
| 35 | 65.5 | 14.5 | 3.0 | 2.6 | 2.0 | 1.5 |  | 6.5 | 4.4 |  |  |  | 2,375 |
| 36 | 63.0 | 16.5 | 6.6 | 3.0 | 2.0 |  | 3.0 | 6.0 |  |  |  |  | 2,510 |
| 37 | 63.0 | 16.5 | 2.7 | 3.0 | 2.0 |  | 3.0 | 6.0 | 3.9 |  |  |  | 2,450 |
| 38 | 67.35 | 16.5 | 6.75 | 3.0 | 1.25 | 1.5 |  | 3.75 |  |  |  |  | 2,340 |
| 39 | 67.35 | 16.5 | 6.65 | 3.0 | 1.35 | 1.5 |  | 3.75 |  |  |  |  | 2,340 |
| 40 | 67.35 | 16.5 | 6.55 | 3.0 | 1.45 | 1.5 |  | 3.75 |  |  |  | SrO, 0.85 | 2,365 |
| 41 | 69.7 | 16.8 | 7.2 | 2.7 | 1.25 | 1.5 |  |  |  |  |  |  | 2,315 |
| 42 | 65.5 | 14.5 | 3.0 | 2.6 | 2.75 |  |  | 7.25 | 4.4 |  |  |  | 2,520 |
| 43 | 65.65 | 16.5 | 6.0 | 3.2 | 1.5 |  |  | 7.25 |  |  |  |  | 2,375 |
| 44 | 65.65 | 16.5 | 6.0 | 3.2 |  |  |  | 7.25 |  | 1.5 |  |  | 2,385 |
| 45 | 64.65 | 15.5 | 5.0 | 3.2 | 1.5 | 1.5 |  | 8.75 |  |  |  |  | 2,390 |
| 46 | 69.0 | 14.0 | 2.6 | 3.0 | 1.0 | 1.5 |  | 5.0 | 3.8 |  |  | NaNO3, 0.5 | 2,210 |

The temperature to which the surface-crystallizable glass is heated to effect surface crystallization thereof is above its annealing point or range. The annealing-point temperature or range will vary with the particular surface-crystallizable glass composition. This temperature can be determined, for example, in accordance with ASTM designation C–336–54T, the testing apparatus being calibrated using fibers of standard glasses having known annealing and strain points as specified and published by the National Bureau of Standards.

In practicing the method features of the invention whereby there is made a glass body or article having a crystalline-containing surface layer formed in situ, the process comprises heating a surface-crystallizable glass composition consisting essentially of the oxides in the ranges of weight percents set forth broadly in the second paragraph of this specification and more specifically in paragraphs subsequent to said second paragraph. This heating is continued through the annealing-point range of the glass composition to a higher temperature at which its viscosity is within the range of from $10^{10.5}$ to $10^{7.65}$ poises, which is a critical viscosity range in producing the surface-crystallized glass structures in the invention. Preferably the viscosity is within the range of from $10^9$ to $10^{7.65}$ poises. At heat-treating temperatures yielding glass viscosities lower than $10^{7.65}$ poises, e.g., $10^{7.6}$ poises, the glass article deforms or tends to deform unless it is adequately supported; while heat treatments at viscosities below $10^7$ poises result in such deformation of the heated article as to render is practically useless for its intended purpose. Heat-treating temperatures yielding glass viscosities above about $10^{10.5}$ but below $10^{13}$ poises result, depending for example upon the particular glass composition, in excessive nucleation leading to bulk crystallization of the heat-treated glass when the latter is heated to a higher temperature.

We found that a very delicate balance exists between the temperature or temperature range at which surface crystallization occurs and that at which the glass deforms. Single-temperature heat treatments at or near the Littleton softening point were required in most cases in order to induce surface crystallization of the surface-crystallizable glass compositions employed. In general, when one obtained glass articles having a satisfactory surface-crystalline condition, the amount of deformation decreased with either increasing glass viscosity or increasing glass liquids temperature.

The Littleton softening point to which reference was made in the preceding paragraph, and the apparatus and technique employed in determining it, are described in, for example, ASTM designation C–338–54T.

In producing surface-crystallized glasses from the particular compositions used in practicing this invention we found that, in general, it is necessary to avoid nucleation of the bulk of the glass while promoting nucleation at the surface. It was also found that the use of compositions containing a minimum total quantity of nucleants or those that contained agents that were found to suppress nucleation or crystallization (e.g., $CeO_2$, CaO and others previously mentioned) effectively obviated nucleation and crystallization. We further found from our research investigations that the degree of opacity or translucency could be varied by using a second temperature above the Littleton softening point providing that the glass body being heat treated had been held at the lower temperature for a period of time sufficient to develop the surface layer to the point where it would support the body against deformation at the higher temperature.

In carrying out the controlled heat treatment to obtain the surface-crystallized articles of the invention, e.g., glass pipe, laboratory glassware, decorative articles, containers such as aerosol containers, etc., the temperature is generally raised rapidly through the annealing and nucleation ranges up to a point at or near the Littleton softening point (more particularly to a glass viscosity in the aforementioned viscosity range of from $10^{10.5}$ to $10^{7.65}$ poises). The glass composition or body, more especially a shaped glass body or article, is held at the higher optimum heat-treating temperature above its annealing-point temperature or range until the desired degree of surface crystallization has been obtained. The period of time of the controlled heat treatment above the annealing temperature may range, for example, from ¼ to 40 hours or more. However, the period of heating may be less than ¼ hour in some cases. Depending upon the size of the glass body to be heat treated, the temperature to which it is to be heated, the particular surface-crystallizable glass composition used, and other variables, heat-treating periods sometimes may be from a few minutes (e.g., 2–5 minutes) up to the aforementioned 15 minutes or more.

The temperature above the annealing-point temperature or range to which the glass article is heated in order to effect surface crystallization is generally within the range of from 1300° F. to 1900° F., and more particularly from about 1400° F. to about 1800° F.

In Table IV are given the heat-treating schedules employed in making surface-crystallized glasses from the surface-crystallizable glass compositions shown in Table II, together with the modulus of rupture and a brief description of the appearance of the surface-crystallized glasses.

The modulus of rupture is measured by supporting individual rods of the semi-crystalline product, about ¼ inch in diameter and about five inches long, on two knife edges spaced four inches apart, and loading the rod on one downwardly acting knife edge centrally spaced from the lower knife edges until breakage of the rod occurs. To make the results more comparable, the rods are first abraded under standard conditions in the area of maximum bending stress with No. 320 grit abrasive paper while the individual sample is rotated in a slowly moving chuck-drill press. Ordinarily, five rods are thus tested to obtain the average value which is calculated in p.s.i. Abraded rods of annealed glass in general, when measured in this manner, show moduli of rupture ranging from 6,000 to 8,000 p.s.i.

Heating is carried out in an electrically heated laboratory furnace having a heating chamber 4″ x 5″ x 12″ and which is provided with electrical heating elements on all six sides. Glass rods, of the individual glass compositions, and which are about ¼ inch in diameter and 5 inches long, are heated in this furnace at the rate of about 600° F. per hour. The approximate viscosity in poises of the various glasses at the different heat-treating temperatures is within the range of from $10^{10.5}$ to $10^{7.65}$ poises at the indicated temperature at which surface crystallization of the individual glass was effected.

The designations "PM" or "TM" in the column of Table IV headed "Glass Composition No." indicate that the glass resulted from a pot melt (about 10 lbs. charge) or a tank melt (about 1,000 lbs. charge). The numbers after "PM" or "TM" indicate the "Melt No."

TABLE IV

| Glass composition No. | Heat treatment, ° F.; and time in hrs. | Approx. log $10^n$ viscosity, where n= | Modulus of rupture, p.s.i. | Appearance |
|---|---|---|---|---|
| 1 (PM-1) | 1,550, 1 | 8.0 | 57,400 | Translucent. |
| 1 (PM-1) | 1,550, 2 | 8.0 | 61,000 | Do. |
| 1 (PM-1) | 1,500, 1 | 8.6 | 30,000 | Transparent. |
| 1 (PM-1) | 1,500, 2 | 8.6 | 17,000 | Do. |
| 1 (PM-1) | 1,470, 4 | 9.0 | 20,000 | Translucent. |
| 1 (PM-1) | 1,500, 4 | 8.6 | 31,000 | Do. |
| 1 (PM-1) | 1,550, 1 plus 1,600, ½ | {8.0 at 1,550, 7.6 at 1,600} | 60,300 | Do. |
| 2 (PM-1) | 1,450, 2 | 9.0 | 45,000 | Transparent. |
| 2 (PM-1) | 1,500, 1 | 8.4 | 31,000 | Do. |
| 2 (PM-1) | 1,450, 1 | 9.0 | 27,500 | Do. |
| 2 (PM-1) | 1,400, 1 plus 1,450, 2 | {9.6 at 1,400, 9.0 at 1,450} | 52,300 | Do. |
| 3 (PM-1) | 1,600, 2 | 7.65 | 56,100 | Opaque. |
| 3 (PM-1) | 1,550, 3 | 8.1 | 47,200 | Transparent. |
| 3 (PM-1) | 1,600, 1½ | 7.65 | 50,600 | Do. |
| 4 (PM-1) | 1,600, 1 | 7.9 | 46,800 | Transparent. |
| 4 (PM-1) | 1,600, 2 | 7.9 | 59,200 | Translucent. |
| 4 (PM-1) | 1,600, 3 | 7.9 | 43,300 | Do. |
| 4 (PM-1) | 1,550, 2 | 8.4 | 44,800 | Transparent. |
| 4 (PM-1) | 1,550, 3 | 8.4 | 52,500 | Translucent. |
| 4 (PM-2) | 1,550, 4 | 8.4 | 51,500 | Do. |
| 4 (PM-2) | 1,500, 6 | 8.9 | 24,800 | Transparent. |
| 4 (PM-2) | 1,500, 8 | 8.9 | 24,100 | Do. |
| 4 (PM-2) | 1,450, 12 | 9.5 | 18,100 | Do. |
| 4 (PM-2) | 1,450, 16 | 9.5 | 15,100 | Do. |
| 4 (PM-2) | 1,450, 24 | 9.5 | 14,500 | Do. |
| 5 (PM-1) | 1,600, 1 | 7.9 | 33,000 | Transluscent. |
| 5 (PM-1) | 1,600, 2 | 7.9 | 45,900 | Opaque. |
| 5 (PM-1) | 1,550, 1 | 8.4 | 28,000 | Transluscent. |
| 5 (PM-1) | 1,550, 2 | 8.4 | 52,100 | Do. |
| 5 (PM-1) | 1,500, 1 | 8.9 | 12,300 | Transparent. |
| 5 (PM-1) | 1,500, 2 | 8.9 | 22,200 | Do. |
| 5 (PM-1) | 1,500, 3 | 8.9 | 45,600 | Transluscent. |
| 5 (PM-1) | 1,450, 4 | 9.5 | 20,300 | Transparent. |
| 5 (PM-1) | 1,500, 1 plus 1,650, 1 | {7.5 [1] at 1,650, 8.9 at 1,500} | 42,600 | Opaque. |
| 5 (PM-1) | 1,500, 1 plus 1,700, 1 | 7.1 [1] at 1,700 | 37,300 | Do. |
| 5 (PM-1) | 1,500, 1 plus 1,750, 1 | 6.7 [1] at 1,750 | 33,200 | Do. |
| 5 (PM-1) | 1,500, 1 plus 1,800, 1 | 6.4 [1] at 1,800 | 27,000 | Do. |
| 5 (PM-1) | 1,500, 2 plus 1,650, 1 | 7.5 [1] at 1,650 | 42,100 | Do. |
| 5 (PM-1) | 1,500, 2 plus 1,700, 1 | 7.1 [1] at 1,700 | 37,200 | Do. |
| 5 (PM-1) | 1,500, 2 plus 1,750, 1 | 6.7 [1] at 1,750 | 35,100 | Do. |
| 5 (PM-1) | 1,500, 2 plus 1,800, 1 | 6.4 [1] at 1,800 | 21,700 | Do. |
| 6 (TM-1) | 1,550, 3 | 8.6 | 50,600 | Transparent. |
| 6 (TM-1) | 1,550, 2 | 8.6 | 38,500 | Do. |
| 6 (TM-1) | 1,550, 1 | 8.6 | 19,100 | Do. |
| 6 (TM-1) | 1,600, 2 | 8.1 | 52,700 | Transluscent. |
| 6 (TM-1) | 1,600, 1½ | 8.1 | 47,500 | Do. |
| 6 (TM-1) | 1,600, 1 | 8.1 | 49,300 | Do. |
| 6 (TM-1) | 1,650, 1 | 7.65 | 52,500 | Do. |
| 6 (TM-1) | 1,650, ½ | 7.65 | 45,400 | Do. |
| 6 (TM-3) | 1,450, 16 | 9.7 | 54,900 | Do. |
| 6 (TM-3) | 1,450, 36 | 9.7 | 50,300 | Do. |
| 6 (TM-3) | 1,500, 3 | 9.2 | 51,200 | Do. |
| 6 (TM-3) | 1,500, 5 | 9.2 | 58,000 | Do. |
| 6 (TM-3) | 1,500, 8 | 9.2 | 53,600 | Do. |
| 6 (TM-3) | 1,560, 2 | 8.6 | 58,100 | Do. |
| 6 (TM-3) | 1,560, 8 | 8.6 | 53,900 | Do. |
| 6 (TM-3) | 1,580, 1 | 8.3 | 58,600 | Do. |
| 6 (TM-3) | 1,580, 2 | 8.3 | 58,200 | Do. |
| 6 (TM-3) | 1,600, 1 | 8.1 | 61,100 | Do. |
| 6 (TM-3) | 1,600, 2 | 8.1 | 57,100 | Do. |
| 7 (TM-1) | 1,500, 3 | 9.6 | 34,100 | Transparent. |
| 7 (TM-1) | 1,550, 2 | 9.0 | 18,600 | Do. |
| 7 (TM-1) | 1,550, 1 | 9.0 | 11,200 | Do. |
| 7 (TM-1) | 1,600, 2 | 8.4 | 50,400 | Transluscent. |
| 7 (TM-1) | 1,600, 1½ | 8.4 | 50,700 | Do. |
| 7 (TM-1) | 1,600, 1 | 8.4 | 42,200 | Transparent. |
| 7 (TM-1) | 1,650, 1 | 7.9 | 47,600 | Transluscent. |
| 7 (TM-1) | 1,650, ½ | 7.9 | 44,800 | Transparent. |
| 8 (TM-1) | 1,500, 3 | 9.7 | 15,000 | Do. |
| 8 (TM-1) | 1,550, 3 | 9.1 | 46,700 | Do. |
| 8 (TM-1) | 1,550, 2 | 9.1 | 30,300 | Do. |
| 8 (TM-1) | 1,550, 1 | 9.1 | 20,100 | Do. |
| 8 (TM-1) | 1,600, 2 | 8.5 | 45,100 | Translucent. |
| 8 (TM-1) | 1,600, 1½ | 8.5 | 46,400 | Do. |
| 8 (TM-1) | 1,600, 1 | 8.5 | 46,000 | Do. |
| 8 (TM-1) | 1,650, 1 | 8.0 | 45,400 | Do. |
| 8 (TM-1) | 1,550, ½ | 9.1 | 47,000 | Do. |
| 9 | 1,600, 2 | 8.8 | 26,000 | Do. |
| 9 | 1,650, 2 | 8.3 | 27,600 | Do. |

[1] These log $10^n$ viscosities are satisfactory at the higher temperature because the viscosity of the glass at the lower heat-treating temperature is within the range of from $10^{10.5}$ to $10^{7.65}$ poises.

Table V shows heat-treating conditions under which surface-crystallization of glass compositions described in Table III can be effected.

TABLE V.—HEAT-TREATING OF GLASS COMPOSITIONS OF TABLE III TO EFFECT SURFACE-CRYSTALLIZATION [1]

| Glass Composition No.: | Heat treatment | | |
|---|---|---|---|
| | 1,500° F., 3 hrs. | 1,550° F., 2 hrs. | 1,600° F., 2 hrs. |
| 10 | Yes | Yes | No |
| 11 | No | Yes | No |
| 12 | Yes | Yes | Yes |
| 13 | Yes | Yes | Yes |
| 14 | Yes | Yes | Yes |
| 15 | No | Yes | Yes |
| 16 | Yes | Yes | Yes |
| 17 | Yes | Yes | No |
| 18 | Yes | No | No |
| 19 | Yes | Yes | No |
| 20 | Yes | Yes | No |
| 21 | Yes | Yes | No |
| 22 | No | No | Yes |
| 23 | Yes | Yes | Yes |
| 24 | Yes | Yes | No |
| 25 | Yes | No | No |
| 26 | Yes | Yes | No |
| 27 | Yes | Yes | No |
| 28 | No | Yes | Yes |
| 29 | No | Yes | Yes |
| 30 | Yes | Yes | Yes |
| 31 | Yes | Yes | Yes |
| 32 | No | No | Yes |
| 33 | No | No | Yes |
| 34 | No | No | Yes |
| 35 | No | Yes | Yes |
| 36 | No | No | Yes |
| 37 | Yes | Yes | No |
| 38 | No | No | Yes |
| 39 | No | No | Yes |
| 40 | No | No | Yes |
| 41 | No | No | Yes |
| 42 | No | No | Yes |
| 43 | No | No | Yes |
| 44 | No | No | Yes |
| 45 | No | No | Yes |
| 46 | Yes | Yes | Yes |

[1] "Yes" indicates sample surface crystallized; "no" indicates sample was glassy or entirely crystallized.

From the foregoing description and tabulated data it will be noted that the in situ surface-crystalized glass bodies of the instant invention are characterized by their good mechanical strengths (most of which are extremely high) as a result of a compression layer at the surface caused by a difference in thermal expansion between the core glass and the thin, crystalline (semicrystalline) layer formed at and in its surface. Mechanical strengths (i.e., modulus or rupture) on abraded cane samples ranged, for example, from about 11,000 to 61,000 p.s.i. with the majority of the samples having values within the range of from about 41,000 to about 61,000 p.s.i. The core glass (i.e., the main glass-body portion) of the surface-crystallized glass article has an average lineal coefficient of thermal expansion, over the range of from 0°–300° C., of from about $35 \times 10^{-7}/°$ C. to about $50 \times 10^{-7}/°$ C. The lineal coefficient of thermal expansion of the crystalline phase is believed to be nearly zero or even slightly negative.

As has been indicated hereinbefore, the aforesaid surface layer or crystalline phase has, as the predominant in situ-formed crystalline species, lithium-containing crystals in the form of beta-eucryptite or beta-eucryptite-like crystals, or beta-spodumene or beta-spodumene-like crystals, or both. The crystalline surface layer of the in situ surface-crystallized bodies of this invention contain a multitude of such crystalline species, in random orientation, dispersed in a glassy matrix, and substantially all of the said crystalline species having a diameter of lesst han 25 microns. It will be understood, of course, by those skilled in the art that the aforementioned glassy matrix remains as a result of the in situ surface crystallization that takes place during the controlled heat treatment of the surface-crystallizable glass.

The terms beta-eucryptite and beta-eucryptite-like crystals are herein used alternatively and in a generic sense. Thus, while beta-eucryptite is often considered as being the species crystal having one mole of lithia, one mole of alumina and two moles of silica, both terms are employed above and elsewhere in this application to designate crystalline species having the beta-eucryptite structure, as shown by X-ray diffraction, but the peaks can be shifted slightly depending upon whether there is a definite amount of silica present other than exactly two moles, i.e., either more or less silica than the two moles. Similarly, the terms beta-spodumene and beta-spodumene-like crystals are herein used alternatively and in a generic sense, specifying crystalline species that have the crystalline structure of beta-spodumene that contains four moles of silica to one of alumina and one of lithia, but with the peaks shifted somewhat when the crystalline structure contains more or less than four moles of silica. Thus, the terms beta-eucryptite and beta-spodumene are each used herein in this generic sense to include the above-described deviations from the norm.

We claim:

1. The method of making a glass body with a high modulus of rupture having on its outer surface a thin, comprissive, crystalline layer of the same oxide composition as the glass, said crystalline layer being about 20 to 300 microns in thickness, said method comprising heating a surface-crystallizable glass composition consisting essentially of the following oxides in weight percent:

| | |
|---|---|
| $SiO_2$ | 60–75 |
| $Al_2O_3$ | 10–20 |
| MgO | 2–10 |
| $Li_2O$ | 2–4 |
| $ZrO_2$ | 0–3 |
| $TiO_2$ | 0–1.5 |
| $SnO_2$ | 0–2 |
| BaO | 0–15 |
| ZnO | 0–10 |
| CaO | 0–10 |
| SrO | 0–2 |
| $Na_2O$ | 0–1 |
| $CeO_2$ | 0–4 |
| $K_2O$ | 0–2 |
| $P_2O_5$ | 0–2 |
| $As_2O_3$ | 0–1 | said heating being continued through the annealing-point range of said glass composition to a higher temperature within the range of from about 1300° F. to about 1900° F. at which its viscosity is within the range of from $10^{10.5}$ to $10^{7.65}$ poises, and holding the said glass composition at the said higher temperature for a time of from about 2–5 minutes up to about 40 hours until the desired degree of surface-crystallization has been obtained.

2. The method as in claim 1 wherein the $SiO_2$, $Al_2O_3$, MgO and $Li_2O$ in the glass composition are in the following approximate weight percents:

| | |
|---|---|
| $SiO_2$ | 62.5–72.5 |
| $Al_2O_3$ | 10.0–17.0 |
| MgO | 2.5–8.0 |
| $Li_2O$ | 2.5–3.5 |

3. The method as in claim 1 wherein the glass composition contains a positive but small amount of at least one member of the group consisting of $ZrO_2$, $TiO_2$ and $SnO_2$ not exceeding 3 weight percent $ZrO_2$, 1.5 weight percent $TiO_2$ or 2 weight percent $SnO_2$.

4. The method as in claim 3 wherein the amount of $ZrO_2$, $TiO_2$ and/or $SnO_2$ in the glass composition is a positive amount not exceeding a total of about 3.5 weight percent, the amount of $ZrO_2$ is within the range of from 0.2 to 1.5 weight percent, the amount of $TiO_2$ also is within the range of from 0.2 to 1.5 weight percent, and the amount of $SnO_2$ is within the range of from 0.1 to 1.0 weight percent.

5. A glass body having a high modulus of rupture and having on its outer surface a thin, compressive, crystalline layer of the same oxide composition as the glass, said body made in accordance with the method defined in claim 1.

References Cited

UNITED STATES PATENTS

| | | | |
|---|---|---|---|
| 3,022,179 | 2/1962 | Morrissey | 65—33 XR |
| 3,022,180 | 2/1962 | Morrissey et al. | 65—33 XR |
| 3,113,877 | 12/1963 | Janakirama. | |
| 3,253,975 | 5/1966 | Olcott et al. | 65—33 XR |
| 3,252,811 | 5/1966 | Beal | 65—33 XR |
| 3,275,493 | 9/1966 | MacDowell | 65—33 XR |
| 3,282,711 | 11/1966 | Lin | 65—33 XR |
| 3,282,712 | 11/1966 | Kyoto et al. | 65—33 |
| 3,298,553 | 1/1967 | Lusher | 65—33 |
| 3,380,818 | 4/1968 | Smith | 65—33 |

FRANK W. MIGA, Primary Examiner

U.S. Cl. X.R.

65—30, 33, 111; 106—39, 52; 161—192

PO-1050
(5/69)

UNITED STATES PATENT OFFICE
CERTIFICATE OF CORRECTION

Patent No. 3,490,984          Dated January 20, 1970

Inventor(s) Richard W. Petticrew, Charles E. Schott & William E. Smith

It is certified that error appears in the above-identified patent and that said Letters Patent are hereby corrected as shown below:

Col. 2, line 15, insert --with-- between "claims" and "references"; line 25, "tives" should be --tive--. Col. 7, line 51, "is" should be --it--; line 67, "liquids" should be --liquidus--. Col. 10, Table IV, the fifth Glass Composition No. 6(TM-3), under the heading "Heat treatment....", "15 0, 8" should be --1500, 8--. Col. 11, line 39, "crystalized" should be --crystallized--; line 46, "or" should be --of--; line 66, "less than" should be --less than--. Col. 12, line 21, "comprissive" should be --compressive--.

Signed and sealed this 13th day of June 1972.

(SEAL)
Attest:

EDWARD M.FLETCHER,JR.          ROBERT GOTTSCHALK
Attesting Officer          Commissioner of Patents